(12) United States Patent
Mina

(10) Patent No.: US 10,513,019 B2
(45) Date of Patent: Dec. 24, 2019

(54) PORTED PISTON FOR AUTOMATIC NAILER

(71) Applicant: Illinois Tool Works Inc., Glenview, IL (US)

(72) Inventor: Nathan Thomas Mina, Lake in the Hills, IL (US)

(73) Assignee: Illinois Tool Works Inc., Glenview, IL (US)

( * ) Notice: Subject to any disclaimer, the term of this patent is extended or adjusted under 35 U.S.C. 154(b) by 240 days.

(21) Appl. No.: 15/481,978

(22) Filed: Apr. 7, 2017

(65) Prior Publication Data

US 2017/0209996 A1 Jul. 27, 2017

Related U.S. Application Data

(63) Continuation of application No. 14/458,419, filed on Aug. 13, 2014, now Pat. No. 9,618,116.
(Continued)

(51) Int. Cl.
*B25C 1/04* (2006.01)
*F16J 9/12* (2006.01)
*F16J 9/08* (2006.01)

(52) U.S. Cl.
CPC .............. *B25C 1/047* (2013.01); *F16J 9/08* (2013.01); *F16J 9/12* (2013.01)

(58) Field of Classification Search
CPC ................ B25C 1/047; F16J 9/08; F16J 9/12
(Continued)

(56) References Cited

U.S. PATENT DOCUMENTS

| 1,719,834 A | * | 7/1929 | De Vito | F16J 9/08 |
| | | | | 92/182 |
| 2,356,909 A | * | 8/1944 | Aske | F16J 9/08 |
| | | | | 277/449 |

(Continued)

FOREIGN PATENT DOCUMENTS

| EP | 1072756 | 1/2001 |
| WO | WO 2007/012455 | 11/2007 |

(Continued)

OTHER PUBLICATIONS

International Search Report and Written Opinion for International Application No. PCT/US2014/051160, dated Oct. 24, 2014 (10 pages).

*Primary Examiner* — Robert F Long
*Assistant Examiner* — Xavier A Madison
(74) *Attorney, Agent, or Firm* — Neal, Gerber & Eisenberg LLP

(57) ABSTRACT

A piston assembly for a nailer is provided, and includes a piston body with an upper surface, a lower surface and a peripheral edge. A peripheral gland is located between the upper and lower surfaces, the gland having an inner closed end and defining an annular space. An annular piston seal is disposed in the gland, and a plurality of spaced air ports are disposed adjacent the peripheral edge, the ports each being in fluid communication with the gland. The gland and the seal are dimensioned so that during a power cycle of the nailer, pressurized air generated during a fastener driving stroke enters the ports and radially expands the seal for enhancing friction between the seal and a surrounding cylinder. During a return stroke, the seal is radially retracted within the gland to reduce friction between the seal and the cylinder.

20 Claims, 5 Drawing Sheets

Related U.S. Application Data

(60) Provisional application No. 61/870,412, filed on Aug. 27, 2013.

(58) Field of Classification Search
USPC .......................................................... 227/130
See application file for complete search history.

(56) References Cited

U.S. PATENT DOCUMENTS

| | | | |
|---|---|---|---|
| 2,462,596 | A | 2/1949 | Bent |
| 2,520,306 | A | 8/1950 | Detweiler |
| 2,931,673 | A | 4/1960 | Gondek |
| 3,094,043 | A | 6/1963 | Powers et al. |
| 3,632,233 | A | 1/1972 | Graham |
| 3,638,532 | A * | 2/1972 | Novak .................... B25C 1/041 |
| | | | 227/130 |
| 2,404,547 | A | 7/1976 | Strid |
| 4,773,305 | A | 9/1988 | Nissels |
| 4,795,173 | A | 1/1989 | Osborne |
| 6,378,328 | B1 | 4/2002 | Cholkeri et al. |
| 9,243,715 | B2 * | 1/2016 | Slack ....................... F16J 15/56 |
| 2007/0163356 | A1 | 7/2007 | Matter et al. |
| 2008/0245840 | A1 | 10/2008 | Beauclair et al. |
| 2009/0090759 | A1 | 4/2009 | Leimbach et al. |
| 2012/0223120 | A1 | 9/2012 | Mina |

FOREIGN PATENT DOCUMENTS

| | | |
|---|---|---|
| WO | WO 2007/124555 | 11/2007 |
| WO | WO 2012/154797 | 11/2012 |

\* cited by examiner

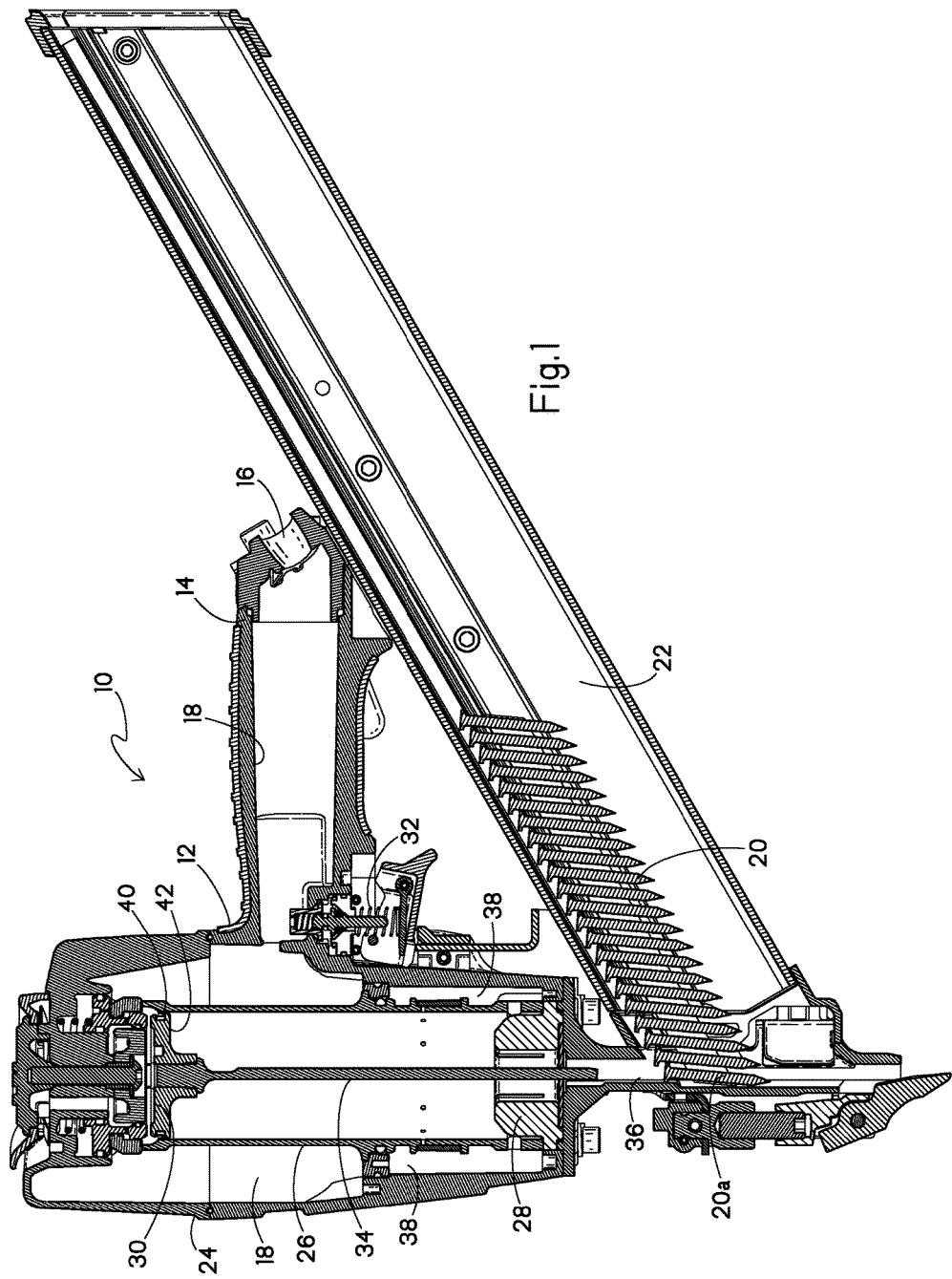

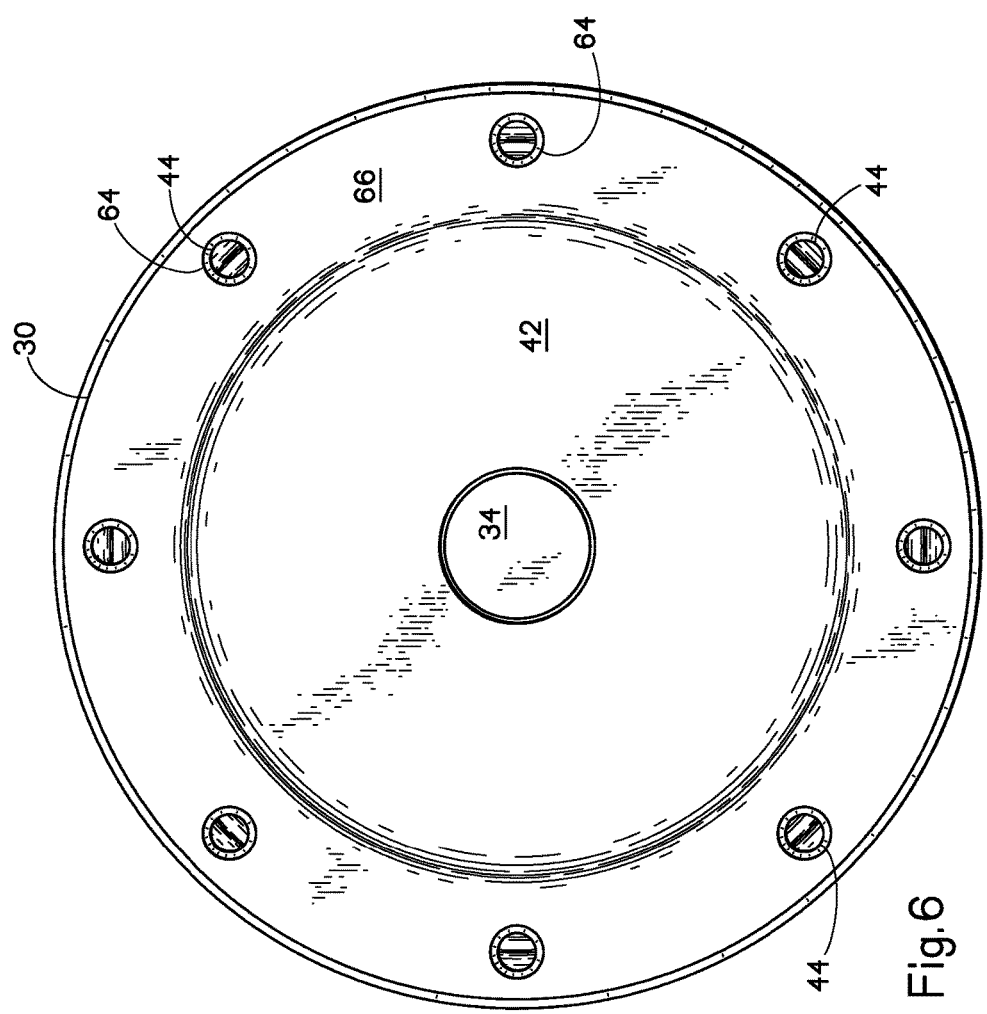

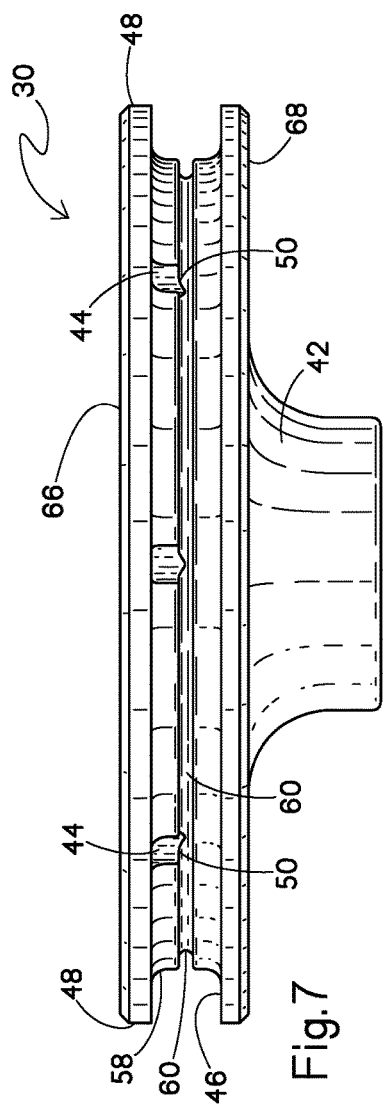
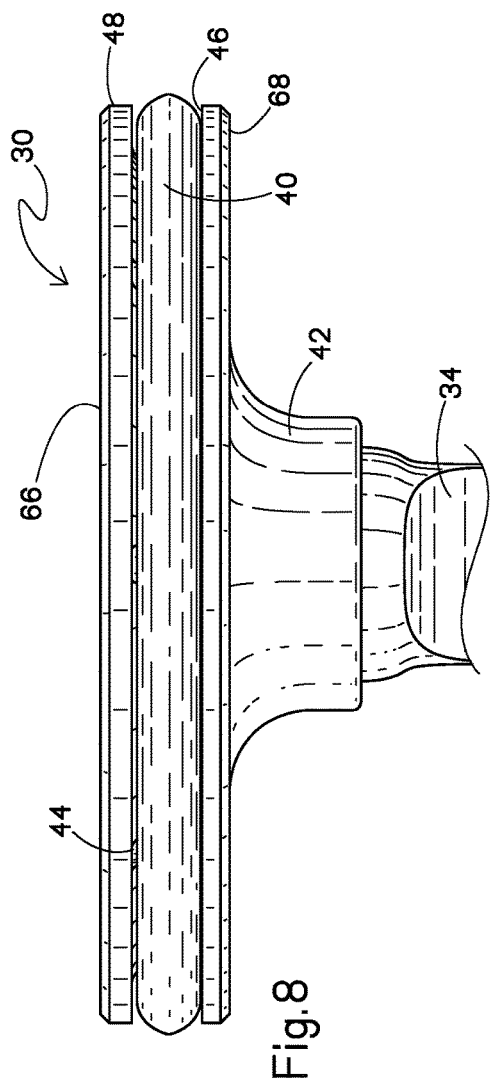

PORTED PISTON FOR AUTOMATIC NAILER

PRIORITY CLAIM

This patent application is a continuation of and claims priority to and the benefit of U.S. patent application Ser. No. 14/458,419, which was filed on Aug. 13, 2014, which claims priority to and the benefit of U.S. Provisional Patent Application No. 61/870,412, which was filed on Aug. 27, 2013, and is now expired, the entire contents of each of which are incorporated herein by reference.

BACKGROUND

The present invention relates generally to fastener-driving tools, and more specifically to such tools operating under pneumatic power, also referred to as nailers.

In conventional pneumatic nailers, such as those disclosed in U.S. Pat. No. 3,638,532 and US Patent Publication No. 2012/0223120 incorporated by reference, the nailer is pressed down upon a workpiece needing a fastener, and in so doing, a workpiece contact element (WCE) is retracted relative to the tool housing. User depression of a trigger activates a trigger valve, which directs pneumatic pressure within the tool such that a piston is driven down a cylinder to impact and drive a fastener into the workpiece.

In the course of driving the piston down the cylinder, the pneumatic pressure is diverted to a return chamber within the tool housing. Once the fastener is driven, the user typically releases the trigger, and/or lifts the tool from the workpiece, which allows the WCE to return to its start position. When either of these conditions occurs, the trigger valve closes and pressure in the return chamber pushes the piston back to the start position. As the trigger is released, the main system pressure closes the main valve on top of the cylinder to prepare for the next cycle.

In pneumatic nailers, traditionally, the piston was provided with a resilient annular seal, similar to an "O"-ring. However, after prolonged use, friction between the seal and the cylinder caused wear on the seal, which as tool use continued, allowed blowby in the cylinder, or the passage of some pressurized air past the piston, reducing tool power.

A proposed solution to the blowby problem is a so-called "K"-seal, which is a molded annular lip seal with a free end projecting at an acute angle relative to the piston perimeter. The lip seal is intended to provide a biased, sealing relationship against the inner wall of the cylinder, to reduce blowby. In practice, K-seals have experienced durability issues. Particularly, K-seals are susceptible to tearing with extended use, and also are susceptible to abrasive wear in the event sand or debris becomes trapped in the cylinder, which is not uncommon, due to dirty air lines commonly found on jobsites where compressors are used for driving pneumatic tools.

Thus, there is a need for an improved pneumatic nailer having a more durable piston seal.

SUMMARY

The present tool features an enhanced piston design which promotes post-fastener driving piston return, by reducing the friction applied by the radially extending piston seat A body portion of the piston features air openings or ports which direct pressurized air to radially expand the seal during the fastener-driving cycle, enhancing the sealing properties of the seat On the return stroke, after the fastener has been driven, the tool is designed to generate a piston return force which drives the piston back to the pre-firing position. In the present piston body, there is sufficient clearance between the seal and the corresponding channel in the piston body that the seal radially retracts under the force of the air used by the tool to return the piston to the pre-driving or firing position. This retraction of the piston seal is enhanced by atmospheric pressure in the tool above the returning piston, which actually exerts a "sucking" action on the piston seal to further retract it.

One of the features of the present piston is that the piston body is provided with a plurality of circumferentially spaced vent ports, each of which is in fluid communication with a main, seal-accommodating channel. Eight of these ports are preferred, but the number may vary to suit the situation. The ports are provided with outlets which follow the radial curve of the main seal channel or gland. The outlets are also preferably located midway between upper and lower margins of the seal gland.

Also, a vertical axis of each air port is tangent to the main seal gland or groove. In other words, the axis is also tangent to an outer diameter of the piston seal. Further, each air port has an inlet which is countersunk into an upper surface of the piston for improving air flow.

More specifically, a piston assembly for a nailer is provided, and includes a piston body with an upper surface, a lower surface and a peripheral edge. A peripheral gland is located between the upper and lower surfaces, the gland having an inner closed end and defining an annular space. An annular piston seal is disposed in the gland, and a plurality of spaced air ports are disposed adjacent the peripheral edge, the ports each being in fluid communication with the gland. The gland and the seal are dimensioned so that during a power cycle of the nailer, pressurized air generated during a fastener driving stroke enters the ports and radially expands the seal for enhancing friction between the seal and a surrounding cylinder. During a return stroke, the seal is radially retracted within the gland to reduce friction between the seal and the cylinder.

In another embodiment, a piston assembly for a nailer is provided including a piston body with an upper surface, a lower surface and a peripheral edge. A peripheral gland is located between the upper and lower surfaces, the gland having an inner closed end and defining an annular space. An annular piston seal is disposed in the gland. A plurality of spaced air ports are disposed adjacent the peripheral edge, the ports each being in fluid communication with the gland. An annular air channel extends radially inwardly from the closed end of the gland, and is in fluid communication with the gland, the air channel being in fluid communication with outlets of the air ports. The gland and the seal are dimensioned so that during a power cycle of the nailer, pressurized air generated during a fastener driving stroke enters the ports and radially expands the seal for enhancing friction between the seal and a surrounding cylinder, and, during a return stroke, the seal being radially retracted within the gland to reduce friction between the seal and the cylinder.

BRIEF DESCRIPTION OF THE FIGURES

FIG. 1 is a vertical cross-section of a pneumatic fastener driver or nailer equipped with the present piston;

FIG. 6 is an overhead plan view of the present piston;

FIG. 7 is a front view of the present piston with the sealing ring removed; and

FIG. 8 is a front view of the present piston and sealing ring.

DETAILED DESCRIPTION

Figure 3:
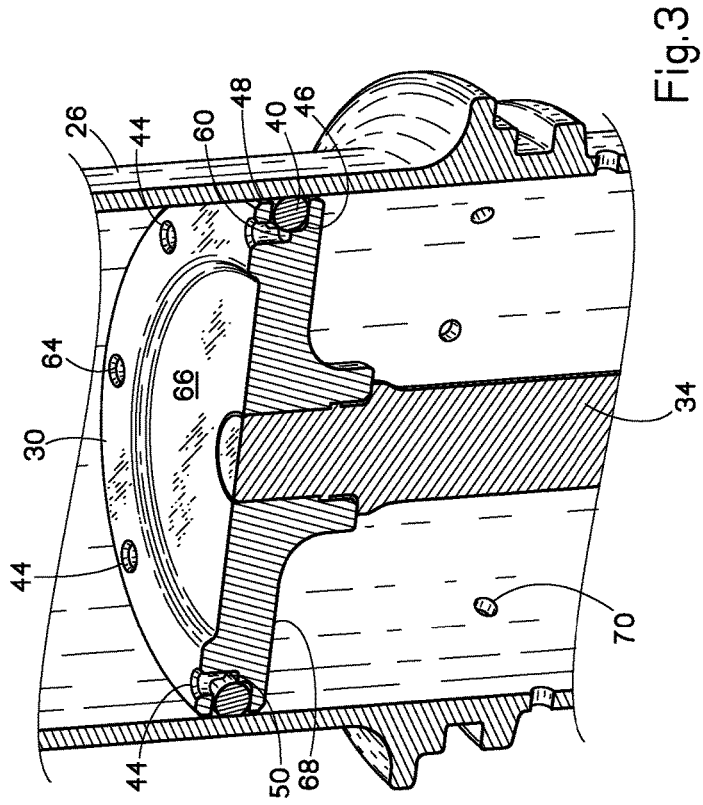
FIG. 3 is an enlarged fragmentary vertical section of FIG. 2.

Referring to FIG. 1, a fastener driving tool or nailer is generally designated 10. Such tools are generally well-known in the art, and are described in the above-listed patents incorporated by reference. Although the focus is presently on a pneumatic tool, it is contemplated that combustion tools may also benefit by being equipped with the present piston. The present tool 10 is shown with a housing 12 having a handle portion 14 equipped with a port 16 through which pressurized air is supplied via a connection to a compressor, as is well known in the art. An interior chamber 18 defined by the housing 12 becomes a pressurized air reservoir is common with pneumatic nailers, Generally, multiple fasteners 20 are sequentially loaded into a magazine 22 that is in some cases removably attached to the tool 10.

A power unit portion 24 of the housing 12 includes a cylinder 26 surrounded by the air chamber 18 and having a bumper 28 at a lower end. A piston 30 is dimensioned to slidingly reciprocate within the cylinder 26. As shown, the piston 30 is in a pre-firing position. During a fastener-driving or power stroke, a trigger valve 32 controlled by a user releases a dose of pressurized air channeled from within the chamber 18 and sufficient for driving the piston down the cylinder 26, towards the bumper 28. A driver blade 34 depending from the piston 30 engages a forward most fastener 20a urged into a nose or shear block 36 and ultimately drives the fastener into a workpiece.

After the driving cycle, the piston 30 is returned to the prefiring position by a blast of pressurized air delivered by a return chamber 38 in the housing 12, separate from the main chamber 18 and receiving its supply of air from the cylinder 26 during the driving cycle, as is well known in the art.

Figure 2:
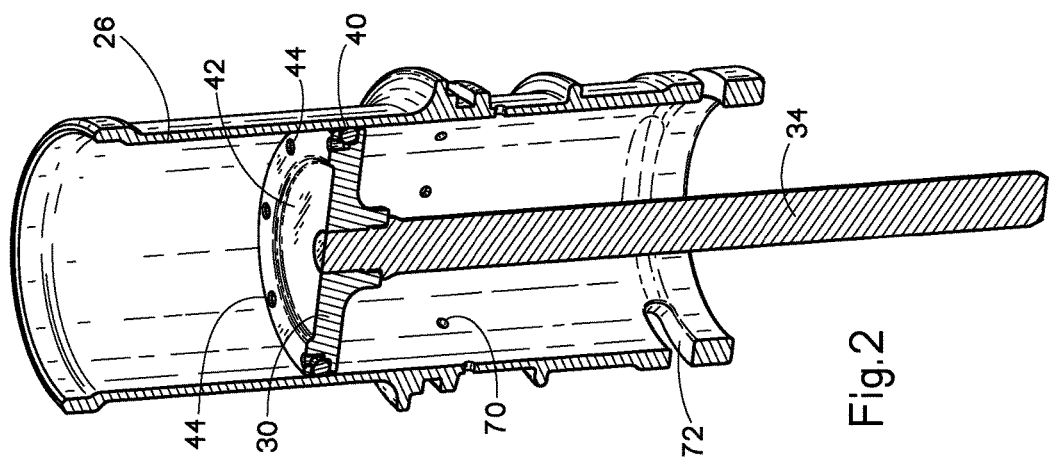
FIG. 2 is a fragmentary vertical cross-section of a cylinder and piston of an automatic nailer of FIG. 1 with the piston incorporating the present seal configuration.
Figure 4:
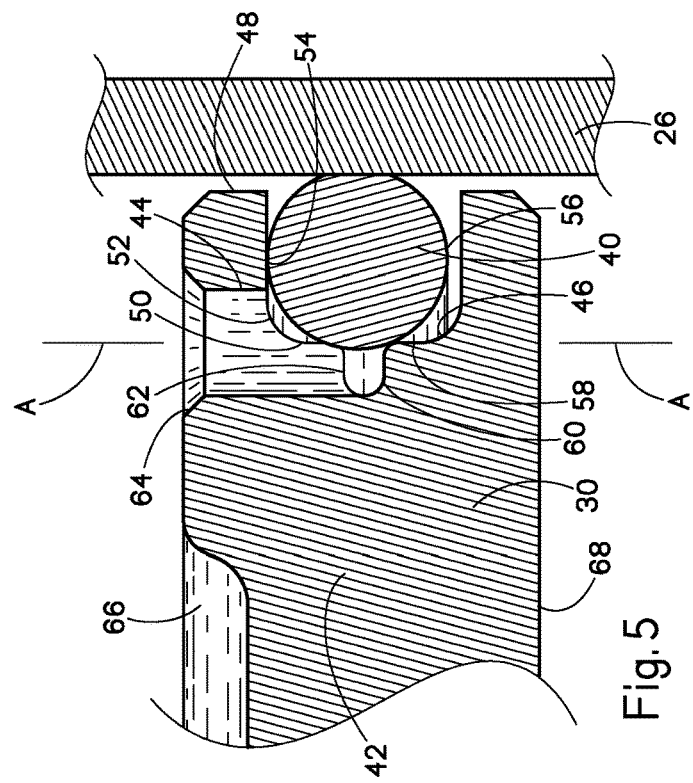
FIG. 4 is a further enlarged fragmentary cross-section of the present piston, shown in the fastener driving or power position.
Figure 5:
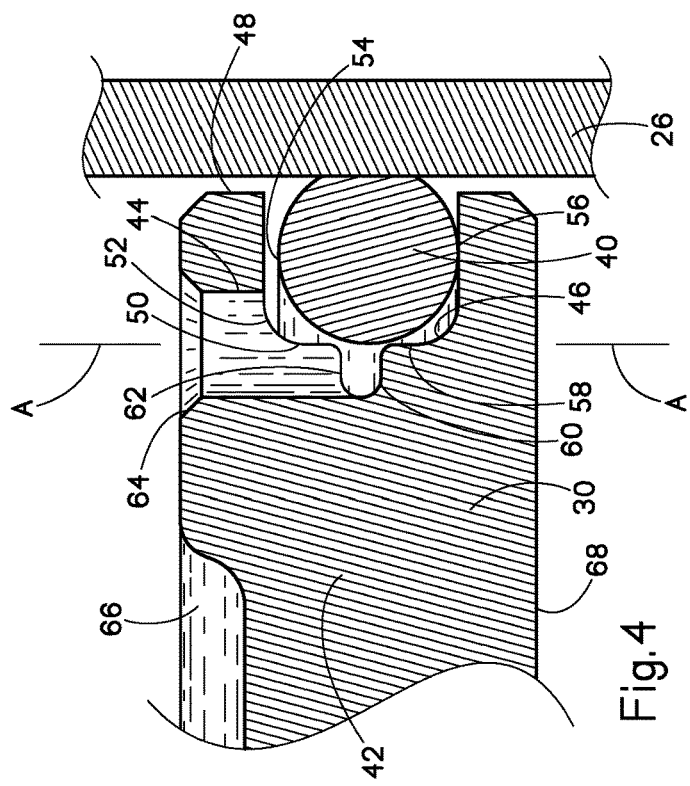
FIG. 5 is a further enlarged fragmentary cross-section of the present piston, shown in the piston return position.

Referring now to FIGS. 2-8, the present tool 10 features an enhanced piston design which promotes post-fastener driving piston return, by reducing the friction applied by a radially extending piston seal 40. In the referred embodiment, the seal 40 is an O-ring; however, the specific shape of the seal may vary to suit the situation. A body portion 42 of the piston features air openings or ports 44 which direct pressurized air to radially expand the seal 40 during the fastener-driving cycle, enhancing the sealing properties of the seal. On the return stroke, after the fastener 20 has been driven, the tool 10 is designed to generate a piston return force which drives the piston 30 back to the pre-firing position.

In the present piston body 42, there is sufficient clearance between the seal and a corresponding annular or peripheral groove or gland 46 in the piston body that the seal radially retracts under the force of the air used by the tool to return the piston to the pre-driving or firing position. While the gland 46 is shown having a laterally opening "U"-shape, this configuration is not required and may vary to suit the application. This retraction of the piston seal 40 is enhanced by atmospheric pressure in the tool 10 above the returning piston 30 (in the orientation of the tool 10 as shown in FIG. 1), which actually exerts a "sucking" action on the piston seal to further retract it.

One of the features of the present piston 30 is that the piston body 42 is provided with a plurality of the circumferentially spaced vent ports 44, each of which is in fluid communication with the gland 46. These ports, 44 eight of which are preferred, but the number may vary to suit the situation, are generally equally spaced about the circumference or peripheral edge 48 of the piston body 42, and spaced inwardly from the actual peripheral edge. The ports 44 are provided with outlets 50 which have a generally radiused portion 52 (FIGS. 4 and 5) following the radial curve of the main seal channel or gland 46. In the preferred embodiment, the outlets 50 are also generally midway between upper and lower margins 54, 56 of the seal gland 46.

In addition to the radiused portion 50, the outlets 48 are in communication with an inner closed end 58 of the gland 46, which also defines an annular, radially inwardly extending space, channel or groove 60. Thus, the outlets 48 also have a generally horizontally extending portion 62 corresponding to the groove 60.

Also, referring again to FIGS. 4 and 5, a vertical axis "A" of each air port 44 is tangent to an inner surface of the main seal gland 46, and also intersects the closed end 58. In other words, the axis "A" is also generally tangent to an inner diameter of the piston seal 40. Further, each air port 44 has an inlet 64 which is countersunk into an upper surface 66 of the piston for improving air flow. As is known in the art, the upper surface 66 is opposite the lower surface 68, from which the driver blade 34 depends.

A feature of the annular space 60 is that air flow entering the inlets 64 from the cylinder 26 during the fastener driving stroke evenly flows around the gland in the space 60 for exerting a relatively evenly-distributed pneumatic radial expanding force on the seal 40.

Referring again to FIGS. 4 and 5, the gland 46 and the seal 40 are dimensioned so that during the power cycle of the nailer 10, pressurized air generated during a fastener driving stroke enters the ports 44 and radially expands the seal for enhancing friction between the seal and the surrounding cylinder 26 (FIG. 4). During a return stroke (FIG. 5), the seat 40 is radially retracted within the gland 46 to reduce friction between the seal and the cylinder 26. This retraction is caused in part by the accommodating dimension of the gland 46, and also by the relative pressure difference between the cylinder 26 below the piston 30 powered by air from the return chamber 38, and atmospheric pressure, to which the cylinder above the piston 30 is exposed during the return cycle. As is known in the art, the return chamber 38 receives pressurized air from the ports 70 in the cylinder 26, and introduces air into the cylinder through the openings 72.

It has been found that the tool 10 equipped with the present piston 30 with the seal 40 has achieved a piston return at least as fast as the prior art "K"-seal, and has a relatively longer operational life, since it is not subject to abrasion from contaminants in the same manner as the "K"-seal.

White a particular embodiment of the present ported piston for automatic nailer has been described herein, it will be appreciated by those skilled in the art that changes and modifications may he made thereto without departing from the invention in its broader aspects and as set forth in the following claims.

The invention claimed is:

1. A fastener-driving tool comprising:
a housing;
a cylinder within the housing;
a piston slidably disposed in the cylinder and movable relative to the cylinder between a pre-firing position and a firing position, the piston comprising a piston body comprising an upper piston surface, a lower piston surface, a peripheral edge between the upper and lower piston surfaces, an upper groove surface, and a lower groove surface, the piston body defining:
a sealing member receiving groove formed between the upper groove surface and the lower groove surface;
an annular air channel radially inward of and in fluid communication with the sealing member receiving groove; and
multiple air ports each having an inlet defined in the upper piston surface and an outlet in fluid communication with the air channel and the sealing member receiving groove;
a sealing member received in the sealing member receiving groove; and
a driver blade attached to the piston,
wherein the sealing member receiving groove, the air ports, the air channel, and the piston seal are configured such that:
during a driving stroke in which pressurized air above the piston forces the piston to move from the pre-firing position to the firing position, the pressurized air enters the air ports and causes the sealing member to move to contact the lower groove surface and to radially expand so a first portion of the sealing member contacts the cylinder, and
during a return stroke in which a pressure differential causes the piston to return from the firing position to the pre-firing position, the pressure differential causes the sealing member to move to contact the upper groove surface and to radially retract so a second portion of the sealing member smaller than the first portion contacts the cylinder.

2. The fastener-driving tool of claim 1, wherein the piston body includes an inner closed end, wherein the sealing member receiving groove is further formed by the inner closed end.

3. The fastener-driving tool of claim 2, wherein the groove, the air ports, the air channel, and the piston seal are configured such that during at least part of the return stroke the sealing member contacts the upper groove surface and the inner closed end.

4. The fastener-driving tool of claim 3, wherein the sealing member prevents fluid from flowing from the sealing member receiving groove to the air ports when the sealing member contacts the upper grove surface and the inner closed end during the return stroke.

5. The fastener-driving tool of claim 2, wherein each of the air ports has an air port longitudinal axis, and wherein the air port longitudinal axes intersect the inner closed end.

6. The fastener-driving tool of claim 1, wherein the cylinder has a cylinder longitudinal axis, wherein each of the air ports has an air port longitudinal axis, and wherein the cylinder longitudinal axis and the air port longitudinal axes are parallel.

7. The fastener-driving tool of claim 6, wherein the air ports are circumferentially arranged radially inward of the peripheral edge.

8. The fastener-driving tool of claim 1, wherein, for each air port, the outlet of that air port forms a radiused portion where the outlet intersects with the sealing member receiving groove and a horizontal portion where the outlet intersects with the air channel.

9. The fastener-driving tool of claim 1, wherein, for each air port, the outlet of that air port is at or below the upper groove surface.

10. A piston assembly for a fastener-driving tool, the piston assembly comprising:
a cylinder;
a piston slidably disposed in the cylinder and movable relative to the cylinder between a pre-firing position and a firing position, the piston comprising a piston body comprising an upper piston surface, a lower piston surface, a peripheral edge between the upper and lower piston surfaces, an upper groove surface, and a lower groove surface, the piston body defining:
a sealing member receiving groove formed between the upper groove surface and the lower groove surface;
an annular air channel radially inward of and in fluid communication with the sealing member receiving groove; and
multiple air ports each having an inlet defined in the upper piston surface and an outlet in fluid communication with the air channel and the sealing member receiving groove;
a sealing member received in the sealing member receiving groove; and
a driver blade attached to the piston,
wherein the sealing member receiving groove, the air ports, the air channel, and the piston seal are configured such that:
during a driving stroke in which pressurized air above the piston forces the piston to move from the pre-firing position to the firing position, the pressurized air enters the air ports and causes the sealing member to move to contact the lower groove surface and to radially expand so a first portion of the sealing member contacts the cylinder, and
during a return stroke in which a pressure differential causes the piston to return from the firing position to the pre-firing position, the pressure differential causes the sealing member to move to contact the upper groove surface and to radially retract so a second portion of the sealing member smaller than the first portion contacts the cylinder.

11. The piston assembly of claim 10, wherein the piston body includes an inner closed end, wherein the sealing member receiving groove is further formed by the inner closed end.

12. The piston assembly of claim 11, wherein the groove, the air ports, the air channel, and the piston seal are configured such that during at least part of the return stroke the sealing member contacts the upper groove surface and the inner closed end.

13. The piston assembly of claim 12, wherein the sealing member prevents fluid from flowing from the sealing member receiving groove to the air ports when the sealing member contacts the upper grove surface and the inner closed end during the return stroke.

14. The piston assembly of claim 11, wherein each of the air ports has an air port longitudinal axis, and wherein the air port longitudinal axes intersect the inner closed end.

15. The piston assembly of claim 10, wherein the cylinder has a cylinder longitudinal axis, wherein each of the air ports has an air port longitudinal axis, and wherein the cylinder longitudinal axis and the air port longitudinal axes are parallel.

16. The piston assembly of claim 15, wherein the air ports are circumferentially arranged radially inward of the peripheral edge.

17. The piston assembly of claim 10, wherein, for each air port, the outlet of that air port forms a radiused portion where the outlet intersects with the sealing member receiving groove and a horizontal portion where the outlet intersects with the air channel.

18. The piston assembly of claim 10, wherein, for each air port, the outlet of that air port is at or below the upper groove surface.

19. A piston for a nailer, the piston comprising:
a piston body comprising an upper piston surface, a lower piston surface, a peripheral edge between the upper and lower piston surfaces, an upper groove surface, a lower groove surface, and an inner closed end, the piston body defining:
 a sealing member receiving groove formed between the upper groove surface, the lower groove surface, and the inner closed end;
 an annular air channel radially inward of and in fluid communication with the sealing member receiving groove; and
 multiple air ports each having an inlet defined in the upper piston surface and an outlet in fluid communication with the air channel and the sealing member receiving groove, wherein the air ports are circumferentially spaced apart radially inward of the peripheral edge.

20. The piston of claim 19, wherein each of the air ports has an air port longitudinal axis, and wherein the air port longitudinal axes intersect the inner closed end.

* * * * *